July 28, 1964 A. A. GOPPERTON 3,142,248
LIMITED AMOUNT CHECKWRITER
Filed April 10, 1963 7 Sheets-Sheet 1

INVENTOR.
Ardath A. Gopperton,
BY
Burns, Jackson, Boettcher & Dienner.
Atty's.

July 28, 1964  A. A. GOPPERTON  3,142,248
LIMITED AMOUNT CHECKWRITER
Filed April 10, 1963  7 Sheets-Sheet 2

INVENTOR.
Ardath A. Gopperton,
BY
Brown, Jackson, Boettcher & Dienner
Attys.

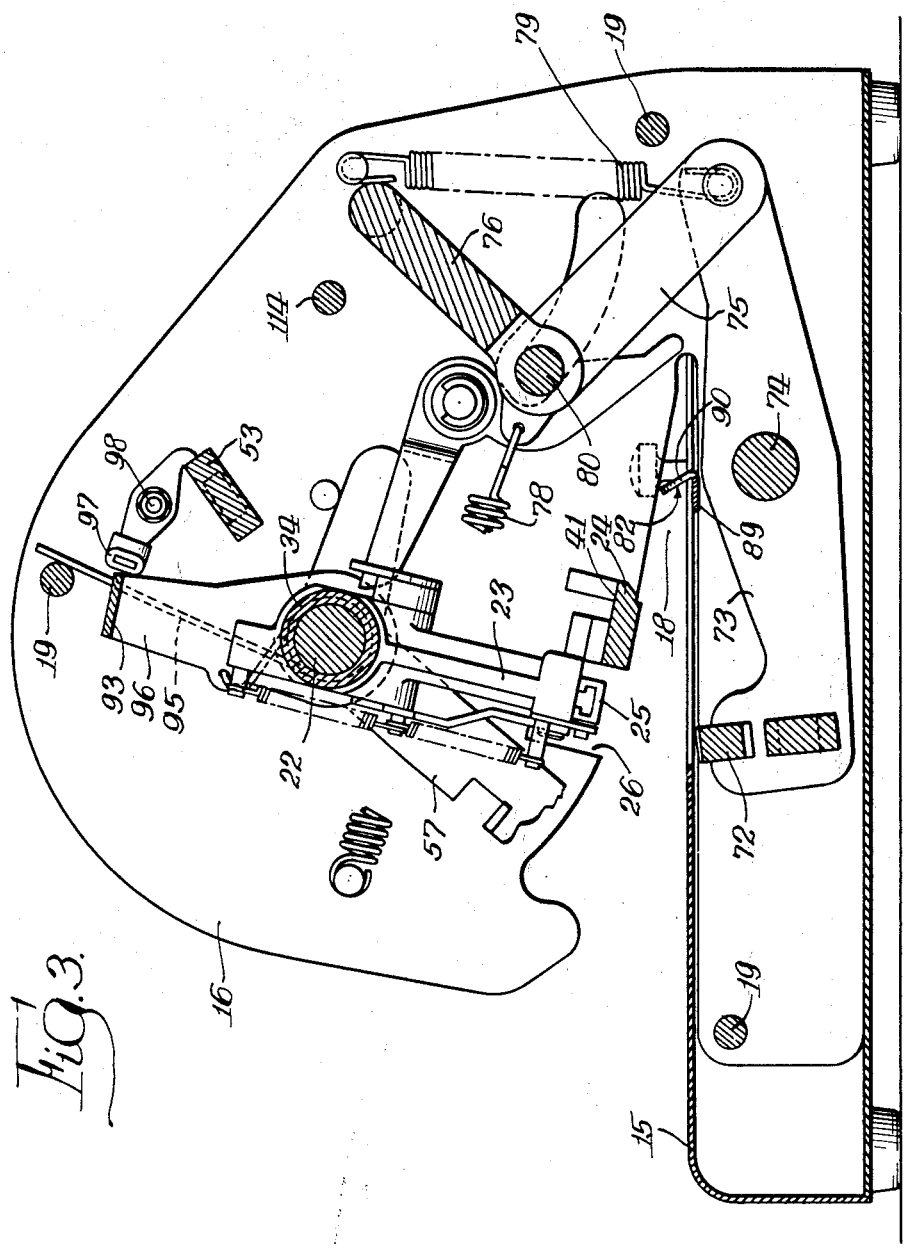

July 28, 1964   A. A. GOPPERTON   3,142,248
LIMITED AMOUNT CHECKWRITER
Filed April 10, 1963   7 Sheets-Sheet 4
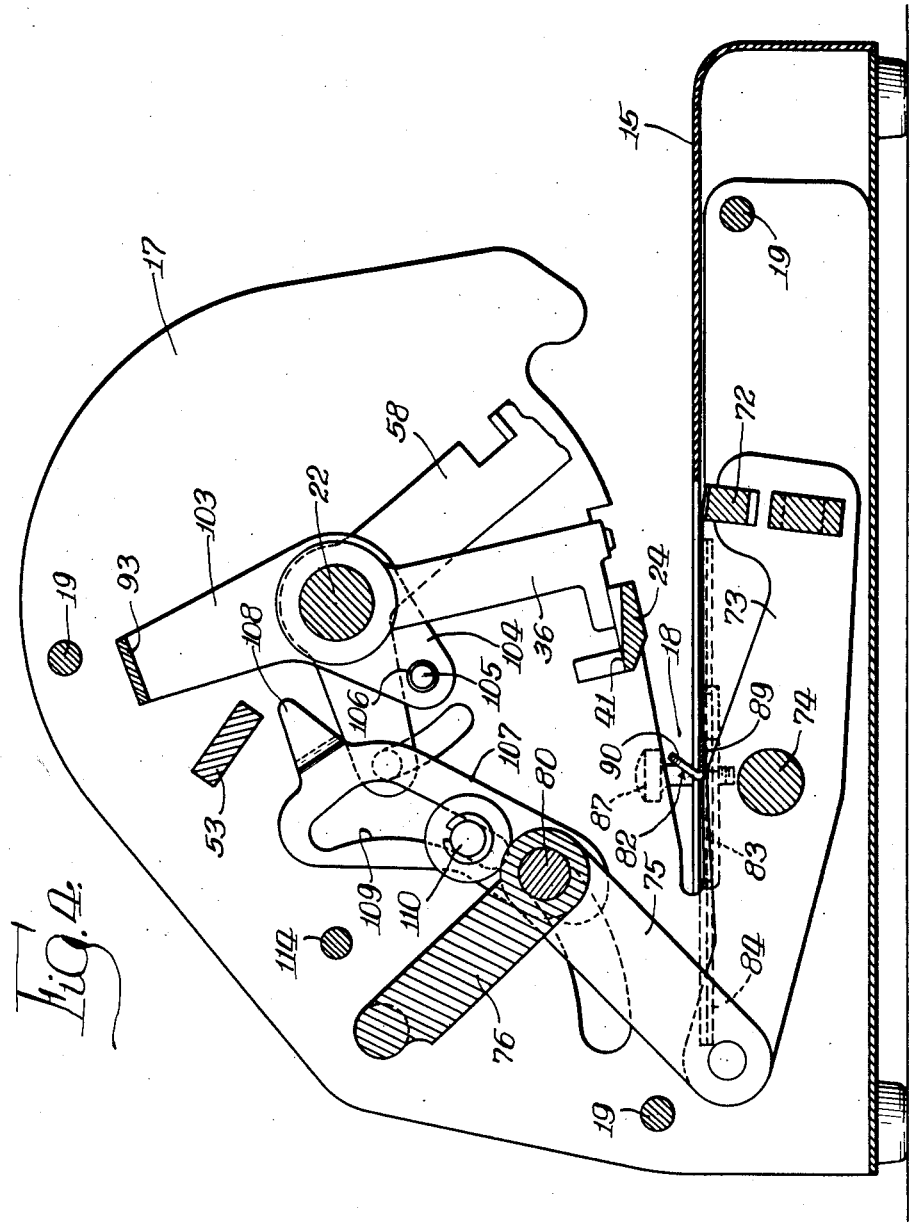
INVENTOR.
Ardath A. Gopperton,
BY Brown, Jackson, Boettcher
& Dienner,
Atty's.

July 28, 1964
A. A. GOPPERTON
3,142,248
LIMITED AMOUNT CHECKWRITER
Filed April 10, 1963
7 Sheets-Sheet 5
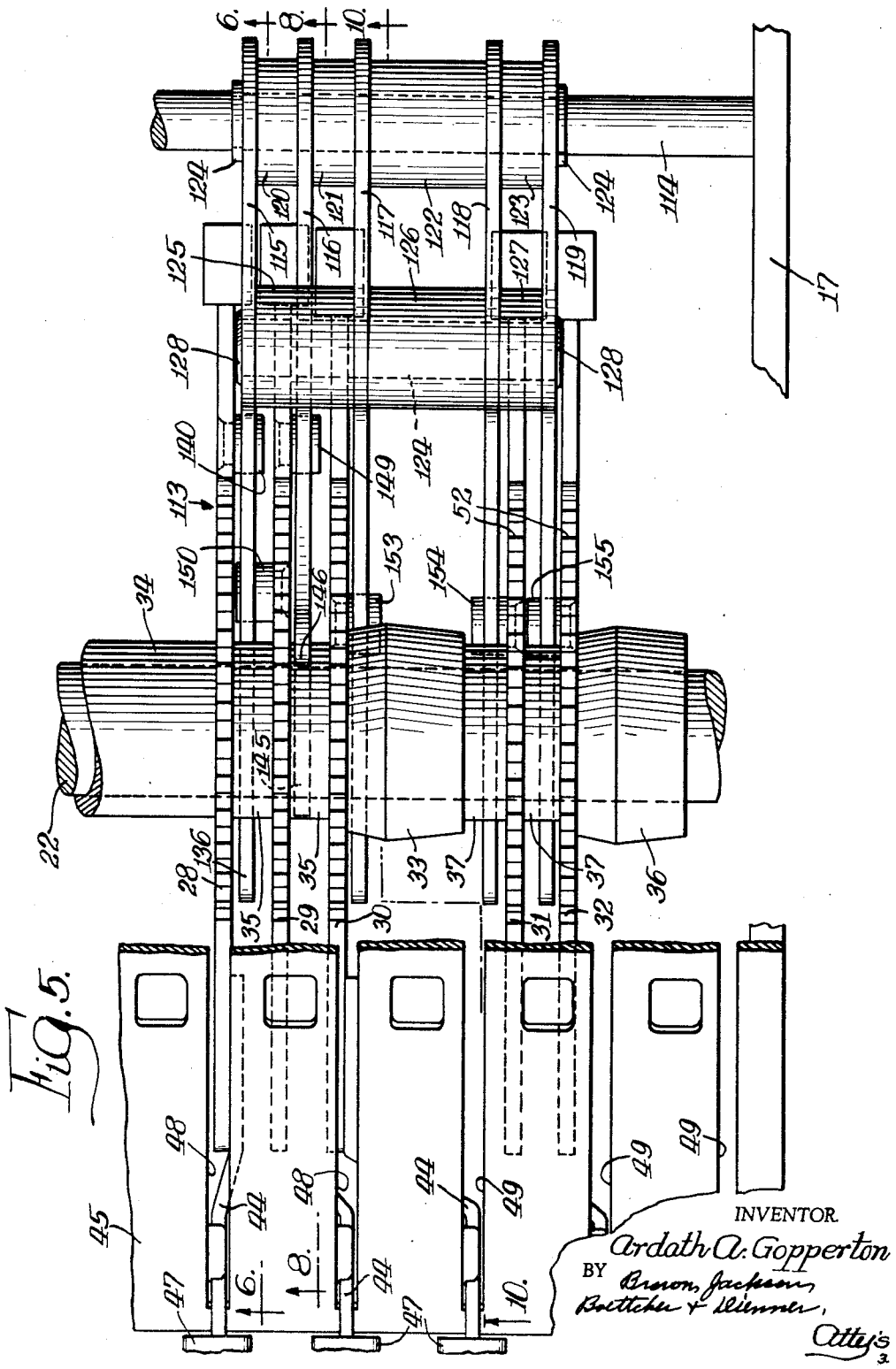
INVENTOR.
Ardath A. Gopperton

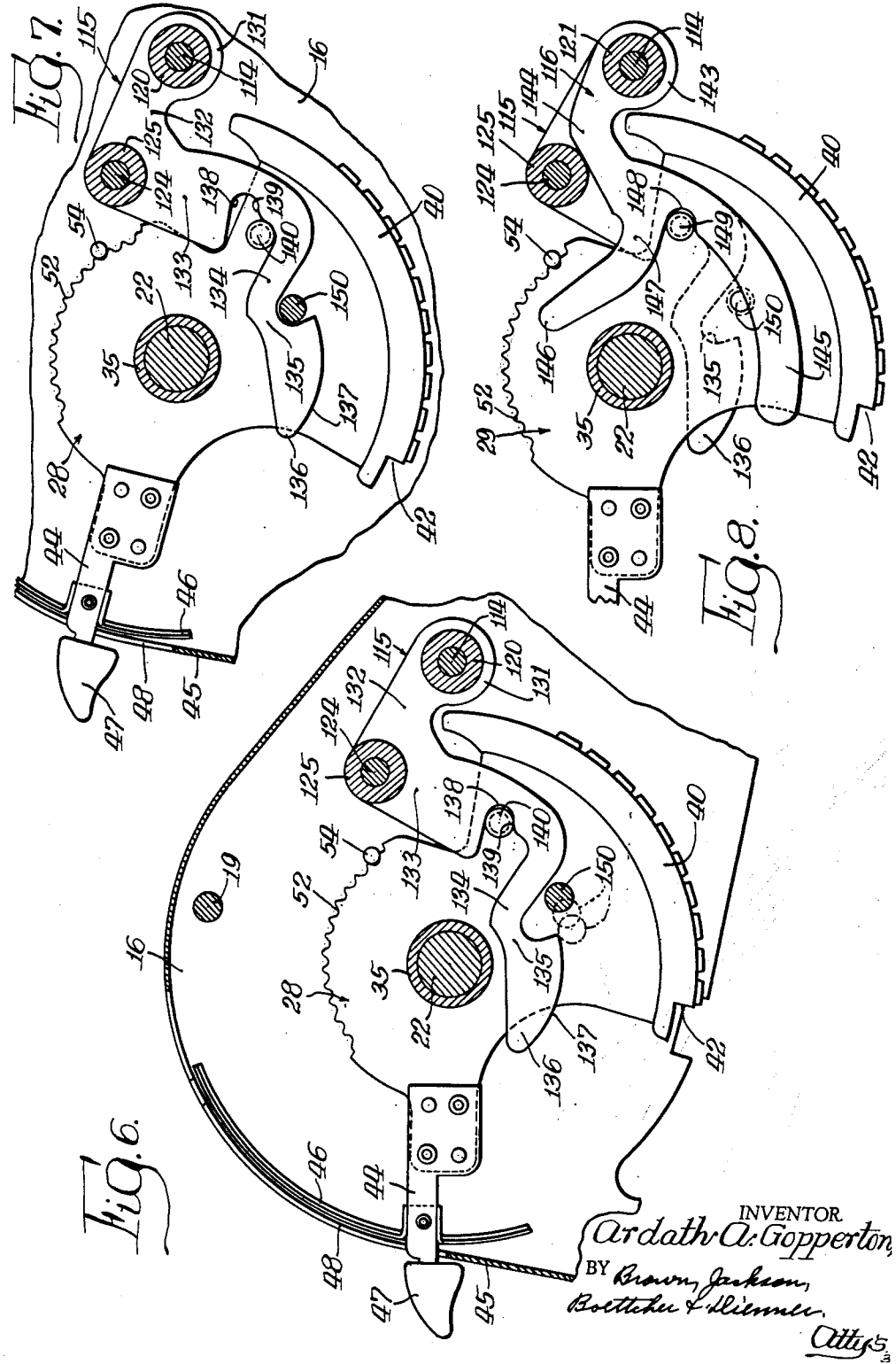

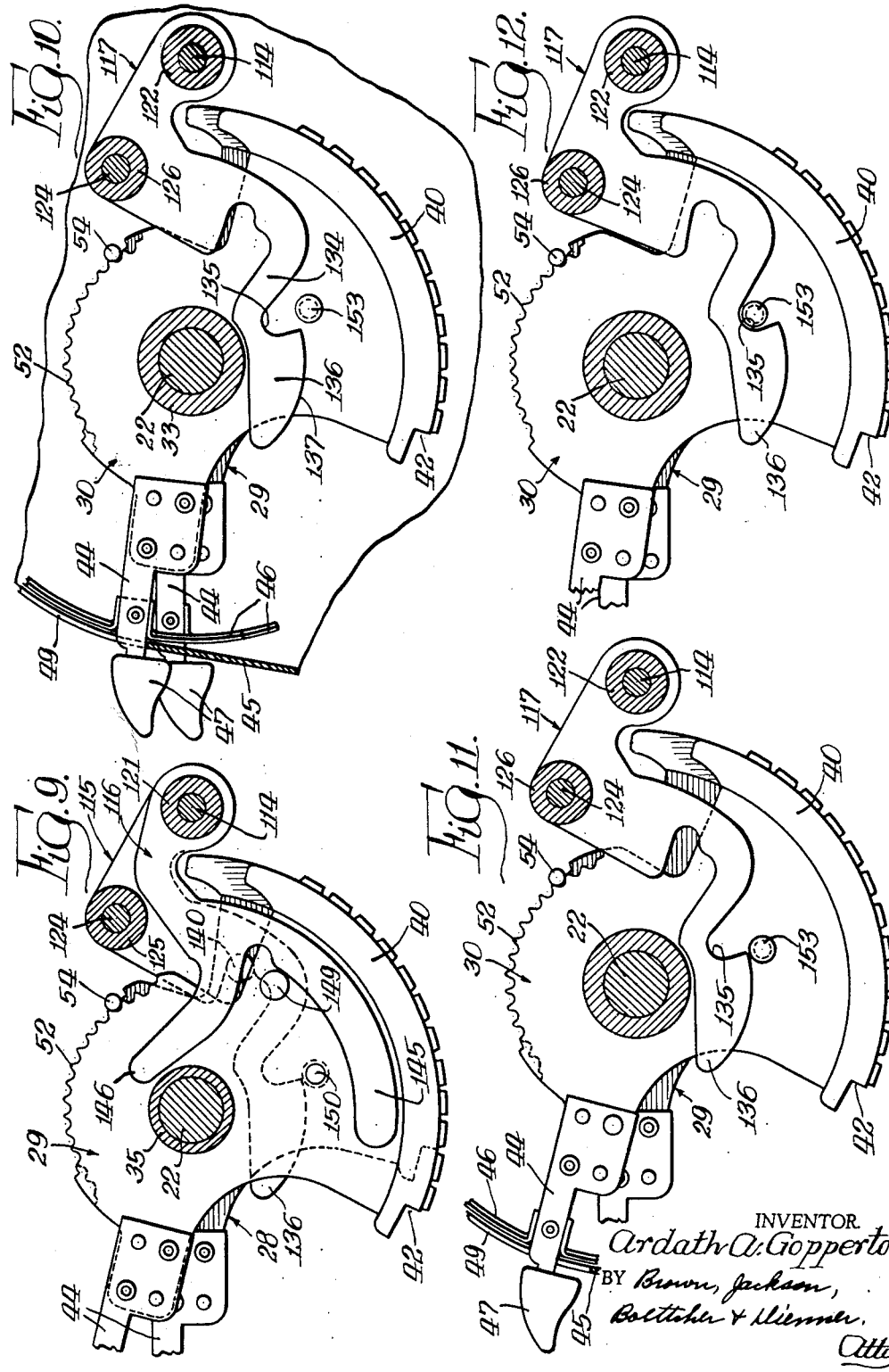

United States Patent Office 3,142,248
Patented July 28, 1964

3,142,248
LIMITED AMOUNT CHECKWRITER
Ardath A. Gopperton, Niles, Ill., assignor to
Theodore B. Hirschberg, Jr., Chicago, Ill.
Filed Apr. 10, 1963, Ser. No. 271,942
6 Claims. (Cl. 101—95)

This invention relates to machines for printing instruments for payment of money, such as checks and money orders.

Machines of the character referred to are commonly termed checkwriters and are extensively used. Currency exchanges and similar establishments which sell money orders and similar instruments usually limit the amount for which a money order is drawn to a maximum of one hundred dollars. It is an object of my invention to provide a checkwriter particularly intended for use in such establishments and in which means is provided whereby a money order or like instrument cannot be printed in an amount greater than one hundred dollars. To that end I provide a plurality of adjustable printing segments, comprising three dollars segments and two cent segments, and associated interlocking means whereby the first dollar segment cannot be moved to an effective printing position for printing an amount greater than the numeral 1, the movement of the first segment to such position being effective for locking all other of the printing segments in zero printing position. The interlock means also comprises means whereby the first dollar segment is locked in a non-printing position responsive to movement of any of the other segments from zero printing position to another printing position, as for printing a money order or like instrument in an amount less than one hundred dollars, thereby effectively guarding against printing of an instrument in an amount in excess of the one hundred dollars maximum. Further objects and advantages of my invention will appear from the detail description.

In the drawings:

FIGURE 3 is a sectional view taken substantially on line 3—3 of FIGURE 2, certain parts being broken away for clearness of illustration;

FIGURE 4 is a sectional view taken substantially on line 4—4 of FIGURE 2;

FIGURE 5 is a top plan view, on an enlarged scale, of the locking lever and type segment assembly;

FIGURE 6 is a sectional view, on a reduced scale, taken substantially on line 6—6 of FIGURE 5;

FIGURE 7 is a view similar to FIGURE 6 but with the first dollar segment turned to position with the printing character 1 thereof disposed on the printing line of the checkwriter;

FIGURE 8 is a sectional view, on a reduced scale, taken substantially on line 8—8 of FIGURE 5;

FIGURE 9 is a view similar to FIGURE 8 but with the second dollar segment turned to position with its numeral 1 disposed on the printing line of the checkwriter;

FIGURE 10 is a sectional view, on a reduced scale, taken substantially on line 10—10 of FIGURE 5;

FIGURE 11 is a view similar to FIGURE 10 but with the third dollar segment turned to position with its numeral 1 disposed on the printing line of the checkwriter; and FIGURE 12 is a view similar to FIGURE 10 but with the locking lever corresponding to the third dollar segment turned downward into locking position.

The checkwriter or machine of my present invention is, in general, similar to the checkwriter disclosed in Patent No. 2,853,001, issued September 23, 1958, to Hubert Jagger, but differs therefrom in respect to those features having to do particularly with my instant invention. It includes an enclosing housing or casing 15, the upper portion of which has been omitted for clearness of illustration, suitably mounted upon the main frame of the machine. The main frame comprises side frame members or plates 16 and 17 of irregular polygonal shape, each having a forwardly extending base element enclosed in the lower or base portion of the casing, the latter defining with the body portions of the plates a rearwardly extending slot 18 for insertion of the money order blank or like instrument into the machine. The side plates 16 and 17 are secured together, in spaced parallel relation, by cross rods 19 suitably secured therein.

Figure 2:
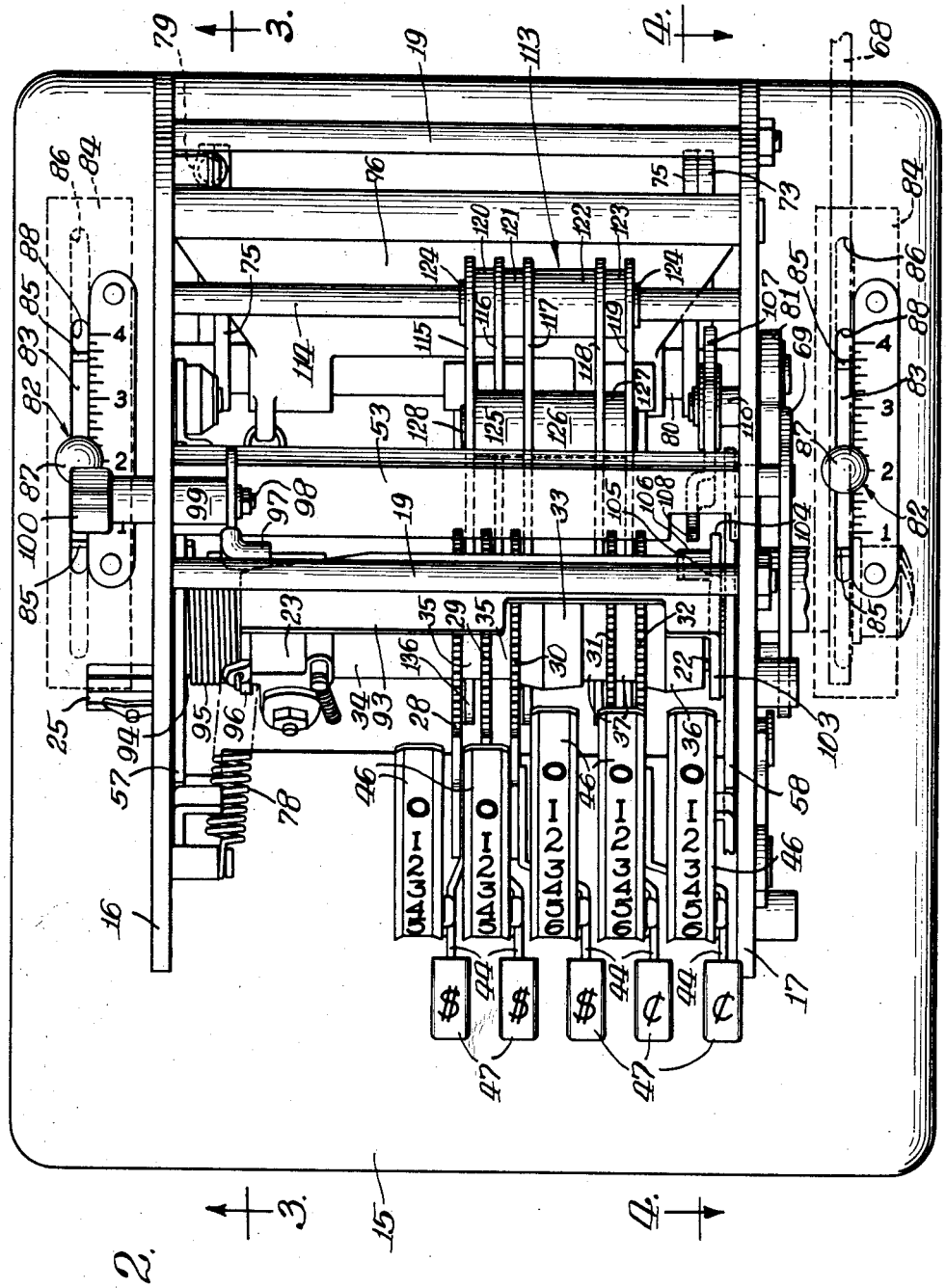
FIGURE 2 is a top plan view of the checkwriter of FIGURE 1.

A shaft 22 is rockably mounted in the frame plates 16 and 17, by means of reduced studs formed at the ends of the shaft and providing shoulders which abut the inner faces of the plates and hold the shaft against endwise movement. A "sum" bar 23 is mounted at its upper end on shaft 22, this bar being spaced inward a short distance from the left hand frame plate 16 as viewed in FIGURE 2, and being secured at its lower end to a guide bar 24 extending transversely of the main frame and secured at its ends in the plate 16 and 17, bar 24 being disposed a short distance rearward of the lower end of the sum bar 23. The lower end of sum bar 23 is of T-cross section and slidably receives a prefix plate 25 of channel cross section. The frame side plate 16 is provided with an opening 26, shown more clearly in FIGURE 3, aligned with a similar opening in the side of casing 15, for ready insertion and removal of the prefix plate 25. The plate 25 is mounted and operated by means the same as disclosed in the above identified Jagger patent. Such means is not essential to my present invention and need not be described in detail here, it sufficing to state that a prefix plate and any suitable operating means therefor may be provided.

A plurality of type segments 28, 29, 30, 31 and 32 are mounted upon shaft 22 for turning movement thereon. The segments 28, 29 and 30, which are dollar segments, are disposed between the upper end of a dollar bar 33 and a collar 34 secured on shaft 22, at the inner end of the sleeve at the upper end of sum bar 23, and are spaced apart by spacing collars 35 on shaft 22. The dollar bar 33 has at its upper end a sleeve receiving shaft 22, is secured at its lower end to guide bar 24 and is provided at its under face with the printing characters "dols" disposed on the printing line of the checkwriter. A cent bar 36, similar to dollars bar 33 but bearing the abbreviation "cts" is disposed adjacent the frame plate 17. The cents segments 31 and 32 are disposed between the dollar bar 33 and the cents bar 36 and are spaced from bar 33 and from each other by spacing collars 37.

An arcuate type bar 40 is suitably secured to the edge portion of each of the segments 28, 29, 30, 31 and 32 for movement therewith. Each type bar 40 is provided, upon its printing face, with a series of characters ranging from zero to nine and arranged in seriatim order. The guide bar 24 is of approximately L-shape in cross section, as shown more clearly in FIGURE 3, and is provided with guide slots 41 extending from front to back thereof and receiving the type bars of the segments for guiding the latter in turning movement thereof about shaft 22. Each of the type bars 40 is of reduced thickness radially at its forward or leading end to provide a notch 42 which is disposed on the printing line, when the corresponding segment is in a non-printing position, to be explained more fully later. The printing characters of all of the segments are serrated for cooperation with a serrated platen to be referred to more fully later. The characters which are used for printing in a given printing operation are those which are disposed in alignment with the prefix plate 25, defining therewith the printing line of the machine, immediately in front of the forward edge of the guide bar 24, which effectively holds the printing segments against any objectionable looseness or play during the printing operation, thus assuring accuracy.

Each of the printing segments has secured thereto a forwardly projecting adjusting arm 44 suitably shaped and disposed to project through a slot in a cover plate 45 of casing 15. A numbered indexing strip 46 is suitably secured to each adjusting arm 44. At its outer end the adjusting arm 44 is provided with a suitable finger grip 47 frictionally secured thereon. The strip 46 is disposed concentrically with the shaft 22 and is marked correspondingly to the arrangement of the characters upon the corresponding type segment. The first two slots 48 in cover plate 45 receive the arms 44 of the first two segments, which are dollar segments, and the three last slots 49 receive the arms 44 of the last three segments, which are the last dollar segment and the two cent segments. The cover plate 45 is further provided, adjacent each slot therein, with an opening or window for observation of the corresponding indexing strip 46, which is disposed to move beneath such opening, as is known. The indexing strips 46 are so disposed that the number or character visible through the opening corresponds to the number or character of the corresponding printing member or segment which is disposed upon the printing line of the machine. The slots 48 extend downwardly to a point a short distance below the arms 44 of the first two dollar segments, when the latter are in non-printing position. The lower ends of the slots 49 are spaced above the ends of the slots 48 a distance such that the last dollar segment and the two cent segments can not be turned rearwardly beyond their normal zero printing position, as will be explained in more detail later.

The printing or type segments being free upon the shaft 22 are adjustable about a common axis for selectively aligning the printing characters thereof on the printing line of the machine, this adjustment of the segments being accomplished by direct movement thereof through the manual operation of the adjusting arms 44. Each of the printing segments is provided with a two way rack 52 formed by cutting teeth in the hub portion thereof. An index bar 53, shown more clearly in FIGURE 3, extends between and is mounted in the frame side plates 16 and 17 in rear of and above shaft 22. The bar 53 carries spring pressed ball detents 54 which engage the racks 52 of the respective printing segments for releasably holding them in adjustment about shaft 22, bar 53 being provided at its lower edge with slots receiving the racks 52 of the respective segments.

Means is provided for inking the printing characters positioned on the printing line of the machine. The inking means may be of suitable known type. A first inking arm 57 is secured on shaft 22 at the inner face of side frame plate 16 and extends forwardly and downwardly from the shaft. A second inking arm 58 is secured on shaft 22 at the inner face of side frame plate 17 and extends forwardly and downwardly from the shaft as well as rearwardly thereof. Each of the arms 57 and 58 is provided at its forward end with an upwardly and rearwardly opening hook element 59. An inking tray 60, carrying three inking rollers 61, 62 and 63, is mounted in the hooks 59 of the arms 57 and 58. To that end, two headed studs 64 are secured to the end walls of tray 60 and extend inwardly thereof, the outer ends of studs 64 being reduced in diameter to provide outwardly projecting pins 65 which engage in hook elements 59. Torsion springs 66 are mounted on the studs 64 with one arm of each spring engaging the upper forward edge portion of tray 60 and the other arm engaging into a notch in a finger extending inwardly from the corresponding inking arm. Normally the inking tray 60 is held in its position shown in FIGURE 3, with the inking roller 63 spaced downwardly a short distance from the printing characters on the printing line of the machine. At the start of the printing operation, the rearward end of tray 60 is released for upward movement, thereby moving the roller 63 into inking contact with the characters on the printing line, after which the inking assembly is moved forward so that roller 63 passes across the characters on the inking line thereby inking them. During the printing operation the inking assembly is moved upward and forward so as to clear the printing members or segments and the inking rollers are rotated so as to assure adequate supply of ink to the roller 63. The inking operating means is similar to that disclosed in the above identified Jagger patent. The particular inking means employed is not an essential feature of my present invention and need not be described here in detail. Suffice it to state that suitable inking means is provided, it being understood that any suitable inking means may be used in the broader aspects of my invention.

Figure 1:
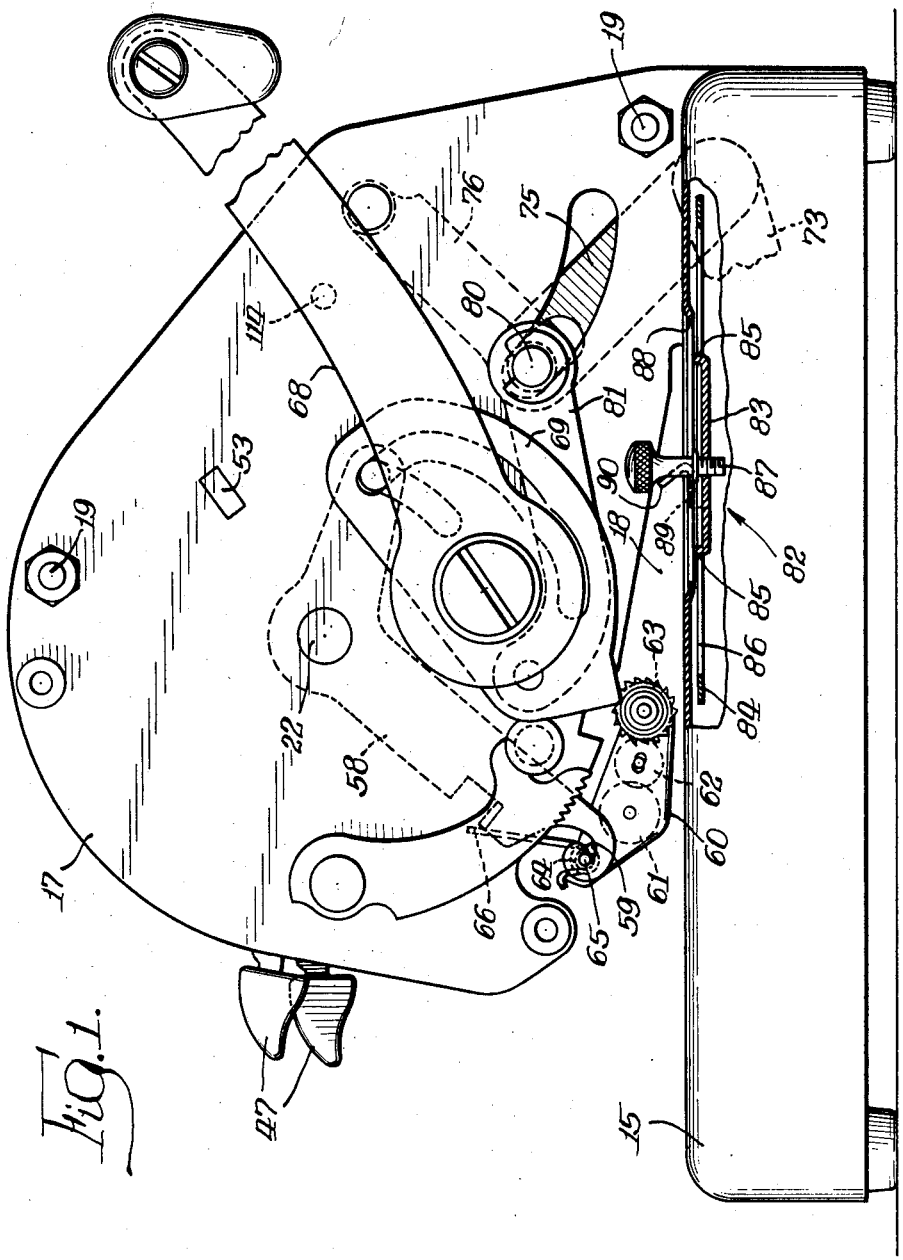
FIGURE 1 is a right side view of a checkwriter embodying my invention, with the upper portion of the casing omitted for clearness of illustration.

An operating lever 68 is secured on the outer end of a bushing rockably mounted on a stub shaft secured in the frame side plate 17. A cam 69 is secured on the bushing and has pin and slot connection to the inking arm 58 for swinging the arms 57 and 58 forward and upward as the lever 68 is swung forward and downward for effecting the printing operation. The lever 68 normally is held in its rearward position shown in FIGURE 1, in which the cam 69 is effective for holding the inking tray 60 depressed with the inking roller 63 spaced downward from the printing line of the machine. In the initial forward movement of lever 68 the inking tray 60 is released for upward movement and the roller 63 is rotated for inking the characters on the printing line, the operation being the same as that disclosed in the above identified Jagger patent.

A platen 72 is suitably mounted at the forward ends of two arms 73 rockably mounted on a cross shaft 74 extending between and mounted in the base portions of the side frame plates 16 and 17. The rearward ends of the arms 73 are pivoted to the lower ends of links 75 having pin and slot connection to a toggle yoke 76 pivoted at its upper end in the plates 16 and 17. The toggle, comprising the links 75 and yoke 76, normally is held in broken or collapsed condition by a tension spring 78 anchored at its rearward end to the upper end of link 75 adjacent the side frame plate 16, the forward upper end of spring 78 being anchored to plate 16 adjacent the front thereof. A second tension spring 79 is anchored at its lower end to the rearward end of the arm 73 adjacent side plate 16 and is anchored at its upper end to the latter plate adjacent the rear thereof. The spring 79 assists the spring 78 in normally maintaining the toggle broken or collapsed and in returning it to that condition. In the normal collapsed condition of the toggle the operating lever 68 is disposed in its normal rearward position and the platen 72 is disposed below the printing line of the machine. In the operating stroke of the lever 68 the toggle is extended and platen 72 is moved upward into pressure contact with the characters of the printing segments then disposed on the printing line of the machine. The upper surface of platen 72 is serrated and, incident to the printing operation, cooperates with the serrated printing characters for perforating the printed area of the money order or like instrument, as will be understood and as is known. The pintle 80 is pivoted to the rearward end of a link 81 pivoted at its forward end to the cam 69, for operating the toggle, the pintle of which extends through arcuate slots in the side plates 16 and 17, and extends outward a short distance beyond side plate 17 for connection to the link 81. The platen operating means is the same as that disclosed in the above-identified patent and need not be described here in greater detail, it being understood that any suitable platen operating means may be used. As previously noted, the upper portions of the frame plates 16 and 17 define with the base portion of the housing or casing a slot for insertion of a money order blank or like instrument. Adjustable stop means 82, which may be of any suitable type, is provided for limiting the extent of insertion of the blank into the machine. The check stop comprises two side members 83 mounted on inwardly extending side flanges 84 of the base. The side members 83 are provided with upwardly extending fingers 85 slidable in lengthwise slots 86 in flanges 84. The members 83 receive adjusting and lock members secured therein and passing through the slots 86, the members 87 also passing through lengthwise slots 88 in the top wall of the base. The members 83 are connected by cross bar 89 having two upwardly projecting fingers 90 which provide the stops proper for limiting insertion of a money order or like instrument into the machine. The particular type of stop means is not of the essence of my present invention and any suitable stop means may be provided.

A clearing yoke 93 of inverted U-shape is mounted for turning movement on shaft 22. The left arm of yoke 93 is disposed between the upper end of the sum bar 23 and a collar on shaft 22 between the sum bar and the left inking arm 57. A torsion spring 95 is mounted about collar 94 with one attached to the left arm 96 of yoke 93 and its other end extending and engaging in back of the top cross rod 19. The spring 95 urges yoke 93 rearward toward the index bar 53. Such rearward movement of yoke 93 normally is limited by a stop finger 97 fixed at its mid-length on the inner end of a stub shaft 98 rockably mounted through an inwardly extending boss 99 of side frame plate 16. An operating member or handle 100 is secured on the outer end of stub shaft 98 for turning the finger 97 to desired position. In the normal position of finger 97, shown in FIGURE 3, it holds the clearing yoke 93 in a forward position spaced away from the index bar 53, the latter limiting turning of finger 97 in clockwise direction as viewed in FIGURE 3. Turning of finger 97 in counterclockwise direction to a second position, limited by the index bar 53, accommodates rearward movement of yoke 93 to a second position in which it is spaced from the bar 93 a distance approximately equal to the width of finger 97. The latter position of yoke 93 is its non-clearing position and the normal forward position thereof is its clearing position, as will be explained more fully presently.

Referring more particularly to FIGURE 4, the right arm 103 of yoke 93 is provided with a rearwardly extending finger 104. A headed stud 105 extends inwardly from finger 104 and is provided with a concentric roller 106. A yoke trip lever 107 is pivoted at its lower end on pintle 80 of the toggle and extends upwardly and forwardly therefrom. The lever 107 is provided with a forwardly extending and inwardly offset trip point 108 and is also provided with a suitably formed opening 109 which receives a stud 110 extending inwardly from the side frame plate 17. When the clearing yoke 93 is in its normal clearing position, during the downward and forward movement of the operating lever 68 the trip lever 107 moves forward and downward until point 108 thereof rests upon roller 106, at which time trip lever 107 moves rearward until point 108 passes off of roller 106 and the trip lever 107 drops to a position in which point 108 is disposed lower than roller 106. In the return movement of the operating lever 68 to normal position, after completion of a printing operation, the trip lever 107 moves forwardly to a position in which point 108 underlies the roller 106, after which the forward end of the trip lever moves upwardly so that point 108 thereof contacts roller 106 thereby swinging the yoke 93 downwardly and forwardly thereby returning to normal position such of the printing segments as may have been turned out of their normal position. Thereafter, in the continued rearward movement of the trip lever to its normal position point 108 thereof passes out of contact with roller 106 and the clearing yoke 93 is returned to its normal position. If the stop finger 97 has been turned to non-clearing position, the yoke 93 is then in its non-clearing position and the roller 106 is disposed forwardly of its normal clearing position a distance such that it is not contacted by point 108 of the trip lever 107. Accordingly, during the printing operation and the return of the operating lever 68 to its normal position, the yoke 93 is not actuated and a clearing operation is not performed. That is desirable in certain cases, as when it is desired to print a plurality of money orders or like instruments for the same amount. As will be understood, the opening 109 in the trip lever 107 is appropriately formed to assure operation of the latter in the manner above described. It will be understood that the clearing yoke operating means shown is by way of example only and that any suitable operating means may be employed.

The checkwriter so far described is, in general, similar to that of the above-identified Jagger patent. It will be understood that, within the broader aspects of my invention, the checkwriter may be of any suitable construction and operation.

Referring more particularly to FIGURES 5 to 12, inclusive, a locking lever assembly 113 is rockably mounted on a cross shaft 114 having reduced end studs extending through corresponding openings in the side frame plates 16 and 17. The assembly comprises a plurality of levers 115, 116, 117, 118 and 119 rockably mounted on the cross shaft 114. The levers are spaced apart by collars 120, 121, 122 and 123 mounted on the shaft 114 and the assembly is restrained against movement lengthwise of shaft 114 by C snap rings 124 engaging in circumferential grooves in shaft 114. The levers 115, 117, 118, and 119 are secured together by a short rod 124 inserted therethrough disposed adjacent and below the index bar 53, the levers being spaced apart by spacing collars 125, 126 and 127 mounted on rod 124 and the ends of the latter being riveted over at 128. The four levers 115, 117, 118 and 119 are thus secured together in parallel spaced relation for movement as a unit.

The lever 115 extends along the right side of the first printing segment 28 parallel therewith and spaced a slight distance therefrom. As shown more clearly in FIGURE 6, it comprises a hub 131 rockably mounted on shaft 114, a neck 132 connecting hub 131 to a body portion 133 of increased width, through which the rod 124 passes. The lever 115 further includes a substantially U-shaped portion 134 extending downwardly and forwardly from body portion 133 and a downwardly opening hook 135 extending forwardly from portion 134 and having a forwardly extending substantially triangular head 136 the lower edge 137 of which is arcuate and is disposed concentrically with shaft 22, when the lever 115 is in its normal position shown. The U-shaped portion 134 of lever 115 is provided, at the base of the body portion 133, with a substantially semi-circular recess 138 and a shoulder 139 extending downwardly and forwardly from such recess. The recess 138 is disposed to receive a cylindrical stud 140 secured in the first type segment 128 and projecting to the right thereof in overlying relation to the recessed area of portion 134 of lever 115. In the normal non-printing position of segment 28 the adjusting arm 44 thereof is disposed a short distance above the lower end of the corresponding slot 48 in the cover plate 45, shown fragmentarily and in section, and stud 140 of segment 28 is seated in recess 138 effectively locking that segment against counterclockwise turning movement; as shown in FIGURE 6.

Referring to FIGURE 8, the second lever 116 comprises a hub 143 rockably mounted on shaft 114, an upwardly and forwardly extending neck 144, a lower arcuate arm 145 extending forwardly from neck 144 and an upper substantially straight arm 146 extending from neck 144 and connected thereto by an arcuate element 147, the arms 145 and 146 diverging forwardly. The lever 116 is provided with a substantially semi-cylindrical recess 148 at the juncture of the arms 145 and 146. The recess 148 receives a cylindrical stud 149 secured in printing segment 29 and projecting to the right thereof, when segment 29 is in its non-printing position shown in FIGURE 8. The segment 29 is also provided with a second cylindrical stud 150 projecting to the left thereof and underlying the hook 135 of lever 115, when the segments 28 and 29 are in their normal non-printing position, as shown in FIGURES 6 and 8. As will be understood from what has been said, the lever 116 may be rocked in either direction about shaft 114 without imparting similar movement to any other of the levers, and cooperates with stud 149 for locking the segment 29 against turning movement in counterclockwise direction from its normal position shown in FIGURE 8.

The levers 117, 118 and 119 are similar to the first locking lever 115 and the elements thereof have been numbered the same as the corresponding elements of lever 115. The third dollar segment 30 has secured thereto a stud 153 projecting to the right thereof and underlying the opening of hook 135 of lever 117 when segment 30 is in its normal zero printing position shown in FIGURE 10. In that position of segment 30 the adjusting arm 44 thereof is at the bottom of the corresponding slot 49 in the cover plate 45, effective for restraining turning of segment 30 in counterclockwise direction, as viewed in FIGURE 10, beyond its normal printing position. In like manner the two cent segments 31 and 32 are also restrained against turning in counterclockwise direction beyond their normal zero printing position. The cent segment 31 has secured therein a stud 154 projecting to the left thereof and underlying the opening of the hook 135 of lever 118, when segment 30 is in its normal zero printing position, in the same manner as the stud 153 of segment 30 underlies the hook of lever 117. The second cent segment 32 also has a stud 155 secured therein and projecting to the left thereof and underlying the opening of the hook 135 of lever 119 when segment 32 is in its normal zero printing position.

When it is desired to print a money order or like instrument for $100.00, the segments are turned to their normal positions, if not then in such positions, segments 28 and 29 being then in non-printing position and segments 30, 31 and 32 being in zero printing position. With the segments all in normal positions, the first dollar segment 28 is turned clockwise, as viewed in FIGURES 6 and 7, two spaces through an angle of approximately 60°, to position with the printing character 1 of its type bar 40 disposed on the printing line of the machine, as shown in FIGURE 7. Incident to such turning movement of segment 28 the stud 140 thereof swings lever 115 downward and rearward a short distance to position with hook 135 thereof engaging over stud 150 of the second dollar segment 29. During such movement of lever 115 the forwardly extending arm of the U-shaped portion 134 thereof contacts stud 150 effective for turning the second segment 29 to its zero printing position, in which it is then locked by the hook 135 of lever 115. The segment 28 is then also locked in its effective 1 printing position by stud 140 thereof in contact with the upper edge of the arm of the U-shaped portion of lever 115, as will be clear from FIGURE 7. In the turning of the segment 29 to its zero printing position the stud 149 of segment 29 turns lever 116 downward and rearward a short distance to position with its upper arm 146 in close proximity to the spacing collar 35 (FIGURE 9) effective for restraining lever 116 against further turning movement in such direction, the lower arm 145 of lever 116 being then concentric with shaft 22 and spaced a slight distance below stud 149, for a purpose to be explained more fully later. The lever 116 performs no locking function beyond that of restraining turning of segment 29 in counterclockwise direction, as viewed in FIGURE 8, beyond its normal non-printing position. The segments 30, 31 and 32 are normally in zero printing position, as above stated. Accordingly, the studs 153, 154 and 155 of those segments are disposed directly beneath the openings of the hooks 135 of levers 117, 118 and 119, as shown in FIGURE 10. As previously explained, the levers 115, 117, 118 and 119 are tied together for movement as a unit. When the lever 115 is swung downward to its locking position of FIGURE 7, the levers 117, 118 and 119 are also swung downward to locking position with the hooks 135 thereof engaging about studs 153, 154 and 155, of segments 30, 31 and 32, respectively, thereby locking them in their normal zero printing position. That will be clear from FIGURE 12 in which the lever 117 is shown in its locking position. The first dollar segment 28 is now locked in its printing position and all other of the segments are locked in zero printing position. The checkwriter is now set for printing a money order or like instrument in the amount of $100.00 and all the segments are locked against movement. As will be clear from FIGURE 7, when the segment 28 is turned to its 1 printing position it is effectively locked against further turning movement in clockwise direction by the lever 115 in cooperation with the studs 140 and 150. An alternative method of setting the checkwriter for printing an instrument of $100.00 is to move first the second dollar segment 29 to zero printing position thereby disposing the stud 150 thereof directly below the opening of the hook 135 of lever 115, stud 150 being then disposed a short distance in front of its position shown in FIGURE 8. The first dollar segment 28 is then turned to its 1 printing position thereby locking all of the segments against movement in the manner previously described. The first segment 28 is then in its 1 printing position and all of the other segments are in zero printing positions, as before. As will be understood from what has been said, the type bar 40 of the first segment 28 may be provided with the printing character 1 only, if desired.

As previously noted, the stud 150 of segment 29 is spaced slightly rearward of the opening of hook 135 of lever 115, due to the fact that the segment 29 normally is in its non-printing position, shown in FIGURE 8. Accordingly, the segment 29 may be turned clockwise to zero printing position in the alternative method of setting the machine for printing a money order in the amount of $100.00 as above described. If the segment 29 is turned from its normal position to any position beyond its zero printing position the stud 50 thereof will pass beneath the lower arcuate edge of head 136 of lever 115 thereby locking the latter against downward movement effective for locking the first segment against turning movement in clockwise direction beyond its non-printing position. That will be clear from FIGURE 6 in which the position of the stud 150, when segment 29 is in "0" printing position, is indicated in dash lines, and its position, when the segment 29 is in "1" printing position, is indicated in dot and dash lines. As previously noted, the segments 30, 31 and 32 normally are in zero printing position with the studs 153, 154 and 155 thereof directly underlying the openings of the hooks 135 of levers 117, 118 and 119, respectively. Referring to FIGURE 10, for example, it will be noted that stud 153 of segment 30 is directly beneath the opening of hook 135 of lever 117. If the segment 30 be turned clockwise one space so as to position the printing character 1 on the printing line, the stud 153 is moved to position beneath the rearward end of head 136 of lever 117 thus locking the latter against downward movement. In like manner if any of the segments 30, 31 and 32 are turned to any printing position beyond zero position, the corresponding levers are locked against downward movement and the first segment 28 remains locked in its non-printing position. Accordingly, the segments 29 to 32, inclusive, may be adjusted for printing any amount less than $100.00 and adjustment of any of such segments to a printing position beyond zero position assures that the first segment 28 remains in non-printing position, thereby effectively guarding against printing a money order or like instrument in excess of $100.00. In that connection, it is to be noted that the lower edge of the head 36 of each of the levers is of such length as to permit adjustment of any of the segments, with the exception of segment 28, throughout the full printing range thereof from zero to 9. In connection with segment 29, the provision of the lever 116 movable separately from the other levers permits of segment 29 being adjusted to any desired printing position, the stud 150 of segment 29 assuring that segment 28 is locked in its non-printing position when the segment 29 is adjusted to a position disposing any printing character thereof other than zero on the printing line.

It will be understood that changes in detail may be resorted to without departing from the field and scope of my invention, and I intend to include all such variations, as fall within the scope of the appended claims, in this application in which the preferred form only of my invention has been disclosed.

I claim:

1. In a machine for printing money orders and like instruments, a plurality of individually adjustable printing members including a first member and a second member and a plurality of other members, said first member having a single effective number printing character and being movable to an initial position ineffective for printing and a second position effective for printing, said second and other members each having number printing characters ranging from zero to nine and being independently movable to dispose selectively any one of said characters in effective printing position when said first member is in its said initial position, said second member having an initial position ineffective for printing, a plurality of locking levers respectively disposed adjacent and substantially parallel with said segments, said first and second segments and the lever adjacent said first segment having cooperating means for holding all of said levers in segment releasing position when said first segment is in its said initial position and for moving said second segment to zero printing position and said levers to locking position responsive to movement of said first segment to its said second position and thereby locking said first segment in its said second position and said second segment in zero printing position, means carried by said plurality of other segments cooperating with the other of said levers when the latter are in locking position and effective for locking said other segments in zero printing position, and operating means for effecting the printing operation.

2. In a machine for printing money orders and like instruments, a plurality of individually adjustable printing members including a first member and a second member and a plurality of other members, said first member having a single effective number printing character and being movable to an initial position ineffective for printing and a second position effective for printing, said second and other members each having number printing characters ranging from zero to nine and being independently movable to dispose selectively any one of said characters in effective printing position when said first member is in its said initial position, said second member having an initial position ineffective for printing, a plurality of locking levers respectively disposed adjacent and substantially parallel with said segments and connected for movement together as a unit, said levers including a first lever extending between said first and second segments, the two latter segments and said first lever having cooperating means effective for holding all of said levers in segment releasing position when said first segment is in its said initial position and for moving said second segment to zero printing position and all of said levers to locking position responsive to movement of said first segment to its said second position, said levers and segments further having cooperating means effective for locking said first segment in its said second position and all other of said segments in zero printing position when said levers are in locking position and for locking said first segment in its said initial position responsive to movement of any of the other segments to a printing position higher than zero when said levers are in segment releasing position, and operating means for effecting the printing operation.

3. In a machine for printing money orders and like instruments, a first segment shaft, a plurality of printing segments mounted on said shaft individually adjustable thereabout and comprising a first segment and a second segment and a plurality of other segments, said first segment having a single effective number printing character and being movable to an initial position ineffective for printing and a second position effective for printing, said second and other segments having number printing characters ranging from zero to nine and being independently movable to dispose selectively any one of said characters in effective printing position when said first segment is in its said initial position, a second lever mounting shaft in rear of and parallel with said first segment shaft, a plurality of locking levers rockably mounted on said second shaft and extending therefrom forwardly respectively adjacent and substantially parallel with said segments, said levers being connected for movement together as a unit and including a first lever extending between said first and second segments, the two latter segments having studs secured thereto extending across said first lever and the latter having elements cooperating with said studs effective for holding said levers in releasing position and for moving said second segment to zero printing position and said levers to locking position and locking said second segment in zero printing position responsive to movement of said first segment to its said second position, said plurality of other segments having studs secured thereto projecting across the corresponding levers and the latter having elements cooperating with the last mentioned studs and effective for locking all of said plurality of other segments in zero printing position when said other of said levers are in locking position, said levers further having elements cooperating with said studs effective for locking said first segment in its said initial position responsive to movement of any other of said segments to a printing position higher than zero, and operating means for effecting the printing operation.

4. In a machine for printing money orders and like instruments, a first segment shaft, a plurality of printing segments mounted on said shaft individually adjustable thereabout and comprising a first segment and a second segment and a plurality of other segments, said first segment having a single effective number printing character and being movable to an initial position ineffective for printing and a second position effective for printing, said second and other segments having number printing characters ranging from zero to nine and being independently movable to dispose selectively any one of said characters in effective printing position when said first segment is in its said initial position, a second lever mounting shaft in rear of and parallel with said first segment shaft, a plurality of locking levers rockably mounted on said second shaft and extending therefrom forwardly respectively adjacent and substantially parallel with said segments, said levers being connected for movement together as a unit and including a first lever extending between said first and second segments, each of said levers comprising a body portion with an arm extending therefrom providing a substantially U-shaped forwardly opening portion and a head extending forwardly from said arm defining therewith a downwardly opening hook, said head underlying said segment shaft and having a lower edge substantially concentric therewith, a stud secured to said first segment projecting into said U-shaped portion of said first lever, the latter having a recess receiving said stud in said initial position of said first segment and a shoulder leading from said recess to said arm, said stud when in said recess being effective for holding said first lever in a raised releasing position thereby holding the other levers in raised releasing position, said second segment having an initial non-printing position and being provided with a stud secured thereto extending across said arm of said first lever in underlying relation to and adjacent the latter in said initial position of said second segment, said stud of said first segment being effective in cooperation with said shoulder for swinging said first lever downward to locking position responsive to movement of said first segment to its said second position and said stud of said second segment being disposed to be contacted by said arm of said first lever in the downward movement thereof effective for moving said second segment to zero printing position and engaging said hook of said first lever over said stud of said second segment effective for locking the latter in zero printing position, studs secured to the other of said segments disposed in the zero printing positions thereof to underlie the openings of the hooks of the corresponding levers to be engaged thereby upon downward movement thereof effective for locking said other segments in zero printing positions, the studs of said second and other segments being free of the hooks of said levers when the latter are in releasing position and disposed to pass beneath the heads of the corresponding levers when any one of said second and other levers is moved to a printing position higher than zero effective for locking said first segment in its said initial position, and operating means for effecting the printing operation.

5. In a machine for printing money orders and like instruments, a plurality of individually adjustable printing members including a first member having a single effective number printing character and movable to a normal initial position ineffective for printing and to a second position effective for printing, the other of said members each having number printing characters ranging from zero to nine and being normally in zero printing position, a clearing yoke for returning said members to normal positions, said other members being movable independently of each other and of said yoke to dispose selectively any one of said characters thereof in effective printing position, when said first member is in its said normal initial position, and said first member being movable independently of said yoke from its said normal initial position to its said second position, means for locking said first member in its said normal initial position responsive to movement of any one of said other members from zero printing position to a higher printing position and for locking all of said other members in zero printing position responsive to movement of said first member from its said normal initial position to its said second position, operating means for effecting the printing operation, and means actuated by said operating means for actuating said yoke and effecting a clearing operation upon completion of the printing operation.

6. In a machine for printing money orders and the like, a plurality of individually adjustable printing members including a first member and a second member and a plurality of other members, said first member having a single effective printing character and being movable to a normal initial position ineffective for printing and to a second position effective for printing, said second and other members each having number printing characters ranging from zero to nine, said second member having a normal initial position ineffective for printing and said other members being normally in zero printing position, a clearing yoke for returning said members to normal positions, said second and other members being movable independently of each other and of said yoke to dispose selectively any one of said characters thereof in effective printing position, when said first member is in its said initial position, and said first member being movable independently of said yoke from its said normal initial position to its said second position, means for locking said first member in its said normal initial position responsive to movement of said second member to printing position and to movement of any one of said other members from zero printing position to a higher printing position and for moving said second member from its said normal initial position to zero printing position and locking said second member and all of said other members in zero printing position responsive to movement of said first member from its said normal position to its said second position, operating means for effecting the printing operation, and means actuated by said operating means for actuating said yoke and effecting a clearing operation upon completion of the printing operation.

References Cited in the file of this patent

UNITED STATES PATENTS

| | | |
|---|---|---|
| 2,697,981 | Rindfleisch | Dec. 28, 1954 |
| 2,853,001 | Jagger | Sept. 23, 1958 |
| 3,071,318 | Allen | Jan. 1, 1963 |